United States Patent
Yoshida et al.

(10) Patent No.: US 10,350,858 B2
(45) Date of Patent: Jul. 16, 2019

(54) INTERLAYER FILM FOR LAMINATED GLASS, AND LAMINATED GLASS

(71) Applicant: SEKISUI CHEMICAL CO., LTD., Osaka (JP)

(72) Inventors: Shougo Yoshida, Shiga (JP); Kazuhiko Nakayama, Shiga (JP); Tatsuya Iwamoto, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 77 days.

(21) Appl. No.: 15/104,321

(22) PCT Filed: Mar. 31, 2015

(86) PCT No.: PCT/JP2015/060258
§ 371 (c)(1),
(2) Date: Jun. 14, 2016

(87) PCT Pub. No.: WO2015/152295
PCT Pub. Date: Oct. 8, 2015

(65) Prior Publication Data
US 2016/0311200 A1    Oct. 27, 2016

(30) Foreign Application Priority Data
Mar. 31, 2014    (JP) .................. 2014-074810

(51) Int. Cl.
*B32B 17/10*    (2006.01)
*B32B 27/22*    (2006.01)
(Continued)

(52) U.S. Cl.
CPC .............. *B32B 17/10* (2013.01); *B32B 3/30* (2013.01); *B32B 17/10587* (2013.01);
(Continued)

(58) Field of Classification Search
CPC ............ B32B 3/30; B32B 17/10; B32B 27/08; B32B 27/22
See application file for complete search history.

(56) References Cited

U.S. PATENT DOCUMENTS

2005/0159545 A1    7/2005    Mashiko et al.
2011/0300356 A1*  12/2011   Takamatsu .............. B32B 17/10
                                                                            428/212
(Continued)

FOREIGN PATENT DOCUMENTS

| CN | 1630670 | 6/2005 |
| EP | 3 029 001 | 6/2016 |

(Continued)

OTHER PUBLICATIONS

Extended European Search Report dated Nov. 9, 2017 in European Application No. 15774491.3.
(Continued)

*Primary Examiner* — Laura A Auer
(74) *Attorney, Agent, or Firm* — Wenderoth, Lind & Ponack, L.L.P.

(57) ABSTRACT

The present invention aims to provide an interlayer film for laminated glass having small optical distortion while having a multilayer structure of two or more layers, and a laminated glass including the interlayer film for laminated glass. The present invention relates to an interlayer film for laminated glass including at least two resin layers laminated together, the interlayer film having a large number of minute recesses and a large number of minute projections on at least one surface, the at least two resin layers including a first surface layer and a second surface layer and each containing a thermoplastic resin and a plasticizer, wherein, provided that the interlayer film is allowed to stand at 23° C. and a humidity of 30% RH for three hours, and cut with a microtome at 23° C. and a humidity of 30% RH in the (Continued)

horizontal direction of the interlayer film at a portion of 80 to 90 μm distant on the first surface layer side from the interface between the first surface layer and a resin layer contacting the interior side of the first surface layer and then at a portion of 50 μm distant from the cut face on the second surface layer side to prepare a resin film 1 having a thickness of 50 μm, the resin film 1 after standing at a temperature of 23° C. and a humidity of 30% RH for three hours has a surface roughness (Rz) measured by a method in conformity with JIS B-0601 (1994) of less than 2.5 μm.

12 Claims, 2 Drawing Sheets

(51) Int. Cl.
  *B32B 3/30* (2006.01)
  *B32B 27/08* (2006.01)
(52) U.S. Cl.
  CPC .. *B32B 17/10596* (2013.01); *B32B 17/10761* (2013.01); *B32B 27/08* (2013.01); *B32B 27/22* (2013.01); *B32B 2250/03* (2013.01); *B32B 2307/412* (2013.01)

(56) References Cited

U.S. PATENT DOCUMENTS

| | | | |
|---|---|---|---|
| 2012/0021231 | A1* | 1/2012 | Hirota .............. B32B 17/10036 428/441 |
| 2012/0135191 | A1* | 5/2012 | Spangler ................. B29C 59/04 428/141 |
| 2015/0174862 | A1 | 6/2015 | Kitano et al. |

FOREIGN PATENT DOCUMENTS

| | | |
|---|---|---|
| EP | 3 029 002 | 6/2016 |
| EP | 3 029 003 | 6/2016 |
| JP | 9-241045 | 9/1997 |
| JP | 9-295839 | 11/1997 |
| JP | 2003-286049 | 10/2003 |
| JP | 2007-331959 | 12/2007 |
| WO | 01/72510 | 10/2001 |
| WO | 2008/134594 | 11/2008 |
| WO | 2014/021459 | 2/2014 |

OTHER PUBLICATIONS

International Search Report dated Jul. 7, 2015 in corresponding International Application No. PCT/JP2015/060258.

* cited by examiner

INTERLAYER FILM FOR LAMINATED GLASS, AND LAMINATED GLASS

TECHNICAL FIELD

The present invention relates to an interlayer film for laminated glass having small optical distortion while having a multilayer structure of two or more layers, and a laminated glass including the interlayer film for laminated glass.

BACKGROUND ART

A laminated glass including two glass sheets and an interlayer film for laminated glass that contains plasticized polyvinyl butyral and is sandwiched between the glass sheets, all bonded together, has been widely used as window glass of automobiles, aircraft, architectures, and the like.

Interlayer films for laminated glass may include a single resin layer, or a laminate of two or more resin layers. If an interlayer film for laminated glass includes two or more resin layers that include a first surface layer and a second surface layer and have different characteristics, the interlayer film can provide various properties that are difficult to achieve with an interlayer film of a single layer structure.

For example, Patent Literature 1 discloses an interlayer film for laminated glass having a triple layer structure that includes a sound insulation layer and two protective layers sandwiching the sound insulation layer. The sound insulation layer of the interlayer film for laminated glass of Patent Literature 1 contains a polyvinyl acetal resin that is highly compatible with a plasticizer and a large amount of plasticizer, thus providing excellent sound insulation properties. The protective layers prevent the large amount of plasticizer in the sound insulation layer from bleeding out, thus preventing reduction of adhesion between the interlayer film and glass.

However, a laminated glass including such an interlayer film composed of a laminate of two or more resin layers may unfortunately cause optical distortion. Such optical distortion is pronounced especially in the case of a laminated glass including an interlayer film extended with heat to follow the curved surface of glass sheets (e.g., curved surface of windshields of automobiles). The optical distortion of laminated glass refers to a phenomenon that an object observed through the laminated glass looks distorted.

CITATION LIST

Patent Literature

Patent Literature 1: JP 2007-331959 A

SUMMARY OF INVENTION

Technical Problem

The present invention aims to provide an interlayer film for laminated glass having small optical distortion while having a multilayer structure of two or more layers, and a laminated glass including the interlayer film for laminated glass.

Solution to Problem

The present invention relates to an interlayer film for laminated glass including at least two resin layers laminated together, the interlayer film having a large number of minute recesses and a large number of minute projections on at least one surface, the at least two resin layers including a first surface layer and a second surface layer and each containing a thermoplastic resin and a plasticizer, wherein, provided that the interlayer film is allowed to stand at 23° C. and a humidity of 30% RH for three hours, and cut with a microtome at 23° C. and a humidity of 30% RH in the horizontal direction of the interlayer film at a portion of 80 to 90 µm distant on the first surface layer side from the interface between the first surface layer and a resin layer contacting the interior side of the first surface layer and then at a portion of 50 µm distant from the cut face on the second surface layer side to prepare a resin film 1 having a thickness of 50 µm, the resin film 1 after standing at a temperature of 23° C. and a humidity of 30% RH for three hours has a surface roughness (Rz) measured by a method in conformity with JIS B-0601 (1994) of less than 2.5 µm.

The present invention is specifically described in the following.

The present inventors have studied about the cause of optical distortion in the case of using an interlayer film for laminated glass including a laminate of two or more resin layers to find out that the cause is a stress remaining in the interlayer film due to the pressure applied when a laminate is rolled to give an interlayer film.

Deaeration properties upon laminating glass and an interlayer film for a laminated glass are important in the production process of a laminated glass. The interlayer film for a laminated glass has minute recesses and projections formed on at least one surface thereof to achieve sufficient deaeration properties in producing a laminated glass. Such recesses and projections are generally formed by rolling a laminate between heated embossing rolls with recesses and projections to transfer the recesses and projections onto the laminate. The rolling treatment of passing the laminate between embossing rolls presumably generates a stress remaining in the obtained interlayer film for laminated glass.

In addition to the embossing step, the laminate is also rolled between heated rolls so that the width of the interlayer film for laminated glass increases. Presumably, such treatment also causes a stress remaining in the obtained interlayer film for laminated glass.

As a result of further intensive studies, the present inventors found the following: the residual stress is concentrated around the interface between a surface layer and a resin layer contacting the interior side of the surface layer in the interlayer film for laminated glass to cause optical distortion; the degree of the residual stress can be determined by measuring the surface roughness (Rz) on the interface side of a resin film prepared by cutting at a specific portion in the horizontal direction of the interlayer film; Controlling the surface roughness (Rz) on the interface side of the resin film to a certain level or lower enables production of an interlayer film for laminated glass having small optical distortion. Such findings have led to the completion of the present invention.

The interlayer film for laminated glass of the present invention has a large number of minute recesses and a large number of minute projections on at least one surface thereof. Preferably, the recesses in the interlayer film for laminated glass of the present invention have a groove shape with a continuous bottom (shape of an engraved line) and are regularly arranged side by side.

Preferably, the recesses in the interlayer film for laminated glass of the present invention have a groove shape with a continuous bottom and are arranged side by side in parallel with one another. Preferably, the recesses in the interlayer film for laminated glass of the present invention have a groove shape with a continuous bottom and are regularly arranged side by side in parallel with one another.

Commonly, easiness of deaeration during preliminary pressure-bonding and final pressure-bonding of a laminated glass including an interlayer film for laminated glass interposed between two glass sheets closely relates to the communication properties and smoothness of the bottoms of the recesses.

If recesses having a groove shape with a continuous bottom are regularly formed side by side on at least one surface of the interlayer film, the communication properties of the bottoms of the recesses are further enhanced to markedly increase the deaeration properties during the preliminary pressure-bonding and final pressure-bonding. If recesses having a groove shape with a continuous bottom are formed side by side in parallel with one another on at least one surface of the interlayer film, the communication properties of the bottoms of the recesses are further enhanced to markedly increase the deaeration properties during the preliminary pressure-bonding and final pressure-bonding. If recesses having a groove shape with a continuous bottom are regularly formed side by side in a regular pattern in parallel with one another on at least one surface of the interlayer film, the communication properties of the bottoms of the recesses are still further enhanced to further markedly increase the deaeration properties during the preliminary pressure-bonding and final pressure-bonding.

The state "regularly formed side by side" refers to uniform arrangement of recesses having a groove shape with a continuous bottom side by side in a predetermined direction which is observed on a surface of an interlayer film having a large number of minute recesses and a large number of minute projections. In the state "formed side by side in parallel with one another", the adjacent recesses are formed side by side in parallel with one another at equal intervals or not necessarily at equal intervals between all the adjacent recesses.

Figure 1:
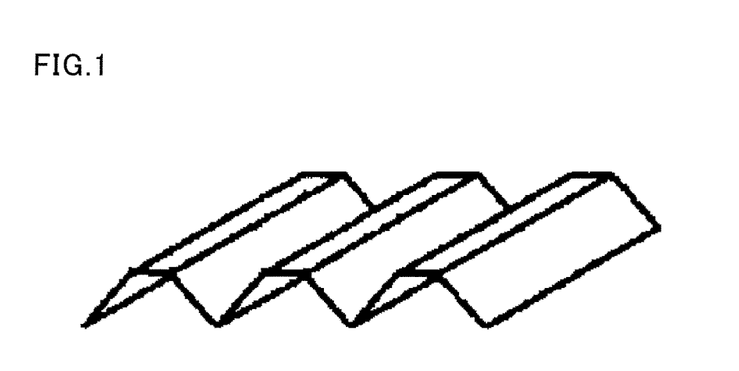
FIG. 1 is a schematic view illustrating an exemplary interlayer film for laminated glass in which recesses having a groove shape with a continuous bottom are arranged side by side in parallel with one another at equal intervals.
Figure 2:
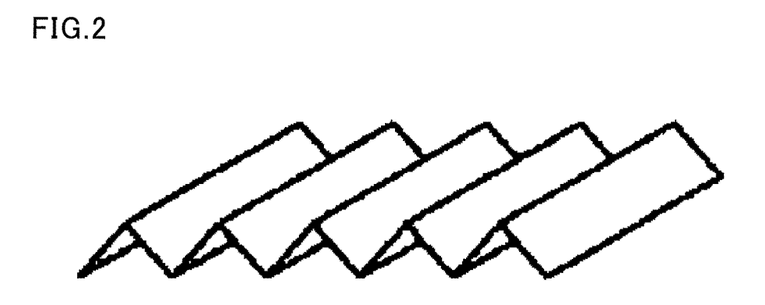
FIG. 2 is a schematic view illustrating an exemplary interlayer film for laminated glass in which recesses having a groove shape with a continuous bottom are arranged side by side in parallel with one another at equal intervals.
Figure 3:
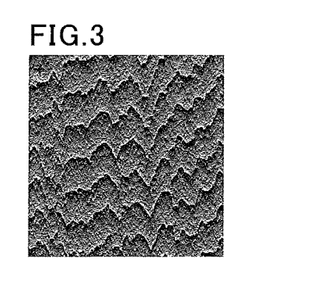
FIG. 3 is image data showing three-dimensional roughness of the surface of the interlayer film for laminated glass in which recesses having a groove shape with a continuous bottom are arranged regularly side by side, which is measured with a three-dimensional roughness tester (KEYENCE CORPORATION, "KS-1100", model number of head: LT-9510VM).

FIGS. 1 and 2 each schematically illustrate an exemplary interlayer film for laminated glass in which recesses having a groove shape with a continuous bottom are formed at equal intervals and the adjacent recesses are formed side by side in parallel with one another. FIG. 3 illustrates image data showing three-dimensional roughness of the surface of the interlayer film for laminated glass in which recesses having a groove shape with a continuous bottom are formed regularly side by side, which is measured with a three-dimensional roughness tester (KEYENCE CORPORATION, "KS-1100", model number of head: LT-9510VM).

The lower limit of the roughness (Rz) of the surface with a large number of minute recesses and a large number of minute projections is preferably 5 μm, and the upper limit thereof is preferably 90 μm. By setting the roughness (Rz) of the surface with a large number of minute recesses and a large number of minute projections within the above range, excellent deaeration properties can be exhibited.

The roughness (Rz) of the surface with a large number of minute recesses and a large number of minute projections as used herein is determined by a method in conformity with JIS B-0601 (1994).

The lower limit of the roughness (Rz) of the recesses in the shape of engraved lines is preferably 10 μm, and the upper limit thereof is preferably 90 μm. By setting the roughness (Rz) of the recesses in the shape of engraved lines within the above range, excellent deaeration properties can be exhibited. The lower limit of the roughness (Rz) of the recesses in the shape of engraved lines is more preferably 20 μm, and the upper limit thereof is more preferably 80 μm.

The roughness (Rz) of the recesses in the shape of engraved lines as used herein is determined by a method in conformity with JIS B-0601 (1994).

The lower limit of the interval between the adjacent recesses in the shape of engraved lines is preferably 10 μm, and the upper limit thereof is preferably 500 μm. By setting the interval between the recesses in the shape of engraved lines within the above range, excellent deaeration properties can be exhibited. The lower limit of the interval between the recesses in the shape of engraved lines is more preferably 50 μm, and the upper limit thereof is more preferably 300 μm.

The interval between the recesses in the shape of engraved lines herein can be determined by calculating the average of the distances between the deepest bottoms of the adjacent recesses based on the measurement of the interval between the adjacent recesses by observation of the first surface and second surface (observation range: 20 mm×20 mm) of the interlayer film for laminated glass with an optical microscope (SONIC Group, "BS-8000III").

The interlayer film for laminated glass of the present invention has a structure in which two or more resin layers including a first surface layer and a second surface layer are laminated together.

Here, the inter layer film having such a laminate structure of the present invention after standing is cut at 23° C. and a humidity of 30% RH for three hours with a microtome at 23° C. and a humidity of 30% RH in the horizontal direction of the interlayer film at a portion of 80 to 90 μm distant on the first surface layer side from the interface between the first surface layer and a resin layer contacting the interior side of the first surface layer and then at a portion of 50 μm distant from the cut face on the second surface layer side to prepare a resin film 1 having a thickness of 50 μm. The resin film 1 after standing at a temperature of 23° C. and a humidity of 30% RH for three hours has a surface roughness (Rz) measured by a method in conformity with JIS B-0601 (1994) of less than 2.5 μm. Similarly, the interlayer film for laminated glass of the present invention after standing at 23° C. and a humidity of 30% RH for three hours is cut with a microtome at 23° C. and a humidity of 30% RH in the horizontal direction of the interlayer film for laminated glass at a portion of 80 to 90 μm distant on the second surface layer side from the interface between the second surface layer and a resin layer contacting the interior side of the second surface layer and then at a portion of 50 μm distant from the cut face on the first surface layer side to prepare a resin film 2 having a thickness of 50 μm. The resin film 2 after standing at a temperature of 23° C. and a humidity of 30% RH for three hours has a surface roughness (Rz) measured by a method in conformity with JIS B-0601 (1994) of less than 2.5 μm.

When the surface roughness (Rz) on the interface side of the resin film 1 is less than 2.5 μm, the optical distortion can be prevented. Moreover, when the surface roughness (Rz) on the interface side of each of the resin film 1 and resin film 2 is less than 2.5 μm, the optical distortion can be prevented. The surface roughness (Rz) on the interface side of each of the resin film 1 and resin film 2 is preferably 1.9 μm or less, more preferably 1.0 μm or less, still more preferably 0.9 μm or less. The resin film 1 and the resin film 2 may be different in the surface roughness on the interface side.

Figure 4:
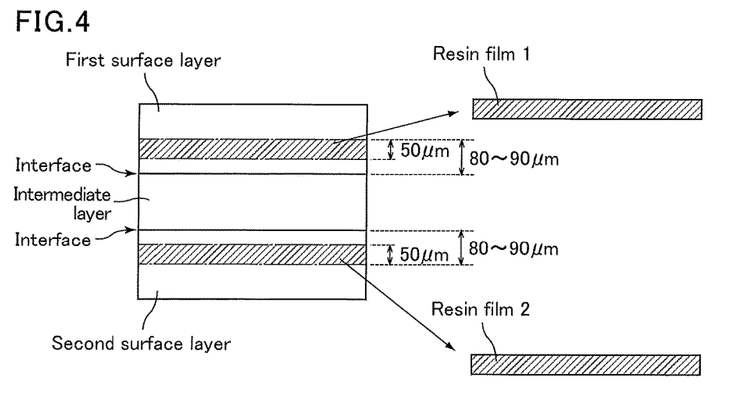
FIG. 4 is a schematic view illustrating sampling positions of a resin film 1 and a resin film 2 in the case where the interlayer film for laminated glass of the present invention has a triple layer structure.

FIG. 4 schematically illustrates sampling positions of the resin film 1 and resin film 2 in the case where the interlayer film for laminated glass of the present invention has a triple layer structure.

The resin film 1 is prepared by cutting the interlayer film for laminated glass at a portion of 80 to 90 µm distant on the first surface layer side from the interface between the first surface layer and a resin layer contacting the interior side of the first surface layer and then at a portion of 50 µm distant from the cut face on the second surface layer side. The residual stress is most likely to be observed at around the interface of two layers. Accordingly, the resin film prepared as above allows accurate prediction of the optical distortion. The same shall apply to the resin film 2. It is to be noted that, though FIG. 4 shows a case where the interlayer film has a triple layer structure, the interlayer film for laminated glass of the present invention may have a double layer structure or a multilayer structure including four or more layers. In the case where the interlayer film for laminated glass of the present invention has a double layer structure, the resin layer contacting the interior side of the first surface layer is the second surface layer, and the resin layer contacting the interior side of the second surface layer is the first surface layer.

Examples of the method for cutting the interlayer film for laminated glass in the horizontal direction include a method using a microtome. For the cutting, the blade of the microtome is preferably changed to a brand-new one. In addition, the surface roughness (Rz) is measured at a portion where no trace of cutting with the microtome is observed. The blade of the microtome is preferably a 819 Blade available from Leica.

The resin film 1 and resin film 2 prepared by cutting the interlayer film for laminated glass in the horizontal direction are allowed to stand, after the cutting, at a temperature of 23° C. and a humidity of 30% RH for three hours before measurement of the surface roughness (Rz) on the interface side. The measurement after the standing for a predetermined time allows observation of the surface roughness resulting from shrinkage of the resin films due to the residual stress in the interlayer film for laminated glass.

The measurement is preferably performed within six hours after the standing at a temperature of 23° C. and a humidity of 30% RH for three hours. The measurement after a lapse of time exceeding six hours may cause a change in the surface roughness, leading to variation in the measured values.

Resin layers forming the first surface layer, second surface layer, and other layer(s) (intermediate layer(s)) contain a thermoplastic resin and a plasticizer.

Examples of the thermoplastic resin include polyvinylidene fluoride, polytetrafluoroethylene, vinylidene fluoride-propylene hexafluoride copolymers, polyethylene trifluoride, acrylonitrile-butadiene-styrene copolymers, polyester, polyether, polyamide, polycarbonate, polyacrylate, polymethacrylate, polyvinyl chloride, polyethylene, polypropylene, polystyrene, polyvinyl acetal, and ethylene-vinyl acetate copolymers. In particular, the thermoplastic resin contained is preferably polyvinyl acetal or ethylene-vinyl acetate copolymers, more preferably polyvinyl acetal.

The plasticizer is not particularly limited as long as it is a plasticizer commonly used for interlayer films for laminated glass. Examples thereof include organic plasticizers such as monobasic organic acid esters and polybasic organic acid esters, and phosphoric acid plasticizers such as organophosphate compounds and organophosphite compounds.

Examples of the organic plasticizer include triethylene glycol-di-2-ethylhexanoate, triethylene glycol-di-2-ethylbutyrate, triethylene glycol-di-n-heptanoate, tetraethylene glycol-di-2-ethylhexanoate, tetraethylene glycol-di-2-ethylbutyrate, tetraethylene glycol-di-n-heptanoate, diethylene glycol-di-2-ethylhexanoate, diethylene glycol-di-2-ethylbutyrate, and diethylene glycol-di-n-heptanoate. In particular, the organic plasticizer contained in the resin layers is preferably triethylene glycol-di-2-ethylhexanoate, triethylene glycol-di-2-ethylbutyrate, or triethylene glycol-di-n-heptanoate, more preferably triethylene glycol-di-2-ethylhexanoate.

The resin layers preferably contain an adhesion modifier. In particular, the resin layers that are to be in contact with glass in production of a laminated glass preferably contains the adhesion modifier.

As the adhesion modifier, for example, an alkali metal salt or alkaline earth metal salt is suitably used. Examples of the adhesion modifier include salts of potassium, sodium, magnesium or the like.

Examples of an acid constituting the salts include organic acids such as carboxylic acids (e.g., octylic acid, hexylic acid, 2-ethylbutyric acid, butyric acid, acetic acid, formic acid) and inorganic acids such as hydrochloric acid and nitric acid. The first surface layer and second surface layer that are to be in contact with glass preferably contain a magnesium salt as an adhesion modifier because the adhesion between the glass and the resin layers can be easily adjusted in production of a laminated glass.

The resin layers may contain, if needed, additives such as ultraviolet absorbers, antioxidants, light stabilizers, modified silicone oil as adhesion modifiers, flame retardants, antistatic agents, damp proofing agents, heat ray reflecting agents, or heat ray absorbing agents.

In the interlayer film for laminated glass of the present invention, the lower limit of the thickness of each of the first surface layer and the second surface layer is preferably 200 µm, and the upper limit thereof is preferably 1000 µm. The lower limit of the total thickness of intermediate layer (s) positioned between the first surface layer and the second surface layer is preferably 50 µm, and the upper limit thereof is preferably 300 µm.

The interlayer film for laminated glass of the present invention has a large number of minute recesses and a large number of minute projections on at least one surface thereof. This ensures deaeration properties in producing a laminated glass. The recesses and projections may be formed only on one surface, and are preferably formed on both surfaces of the interlayer film for laminated glass because deaeration properties are further enhanced.

In the interlayer film for laminated glass of the present invention, the refractive index difference between the first surface layer or second surface layer and an intermediate layer arranged therebetween is preferably 0.05 or less. The refractive index difference of 0.05 or less can further prevent optical distortion.

In the interlayer film for laminated glass of the present invention, the creep elongation rate at 80° C. (80° C. creep elongation rate) is preferably 80% or lower, more preferably 60% or lower, still more preferably 50% or lower, particularly preferably 35% or lower. The 80° C. creep elongation rate maintained within the preferable range can further prevent an increase in the optical distortion due to the elongation. A lower 80° C. creep elongation rate is preferred, and the substantial lower limit thereof is 10%.

The 80° C. creep elongation rate is preferably the 80° C. creep elongation rate of the interlayer film for laminated glass prior to formation of a large number of minute recesses and a large number of minute projections. In actual, however, direct measurement of the 80° C. creep elongation rate of the interlayer film for laminated glass prior to formation of a large number of minute recesses and a large number of minute projections is difficult. Instead of the direct measurement, for example, the 80° C. creep elongation rate of the interlayer film for laminated glass can be measured by the following procedure.

The interlayer film for laminated glass is sandwiched between two polyethylene terephthalate sheets (30 cm in length×30 cm in width×0.1 mm in thickness, hereafter, also simply referred to as "PET sheet"), and the laminate is further sandwiched between two clear glass sheets (30 cm in length×30 cm in width×2.5 mm in thickness) in conformity with JIS R 3202 (1996). The portion protruding from the laminate is cut, thereby preparing a structure including a clear glass sheet/a PET sheet/an interlayer film for laminated glass/a PET sheet/a clear glass sheet laminated in this order in the thickness direction. The structure is placed in an autoclave and held under the conditions of a temperature of 140° C. and a pressure of 1300 kPa for 10 minutes. Then, the temperature is lowered to 50° C. and the pressure is returned to atmospheric pressure. The interlayer film for laminated glass is then peeled from the PET sheet. The peeled interlayer film for laminated glass is left in an atmosphere at 25° C. and 25% RH for 24 hours so that the temperature and the moisture thereof are conditioned. The conditioned interlayer film for laminated glass is cut to a size of 8 cm in length and 1 cm in width, thereby preparing a sample for determining the creep elastic modulus. Gauge marks are drawn on the sample at positions of 2 cm from the midpoint in the longitudinal direction of the sample. The thickness of the sample is measured and the initial cross-sectional area of the sample is determined. The sample is then vertically suspended in an autoclave set to 80° C., and a weight of 20 g is attached to the lower end of the sample. The sample is left in that state for 30 minutes. After a lapse of 30 minutes, the sample is placed in an environment of a temperature of 25° C. and a humidity of 25% RH right away. The distance between the two gauge marks on the sample (gauge length) is measured after 60 seconds from the moment (set to 0 second) when the sample is taken out from the autoclave. Based on the change in the distance between two gauge marks, the 80° C. creep elongation rate is calculated using the following equation:

80° C. creep elongation rate (%)=100×(gauge length after the test (mm)−gauge length before test (mm))/(gauge length before test (mm)).

The interlayer film for laminated glass of the present invention preferably has a creep elastic modulus at 80° C. (80° C. creep elastic modulus) of 0.030 MPa or higher, more preferably 0.035 MPa or higher, still more preferably 0.040 MPa or higher, particularly preferably 0.05 MPa or higher. The creep elastic modulus at 80° C. within the preferable range can further prevent an increase in the optical distortion due to the elongation. A higher 80° C. creep elastic modulus is more preferred, and the substantial upper limit thereof is 0.25 MPa.

The 80° C. creep elastic modulus is calculated by the following equation based on the initial cross-sectional area of the sample, the 80° C. creep elongation rate determined by the above method, and the weight applied:

80° C. creep elastic modulus (MPa)=(Weight applied (N))/(initial cross-sectional area of sample (mm$^2$)×80° C. creep elongation rate (%)/100).

The surface roughness (Rz) of the resin films 1 and 2 may be achieved by any method. Since a residual stress in the interlayer film for laminated glass is generated upon pressure-rolling in which the laminate is passed through rolls to be extended, the surface roughness (Rz) of the resin films 1 and 2 can be reduced by adjusting the rolling conditions.

Specifically, a method may be employed in which the temperature of the laminate right before passing through rolls is lowered and the roll temperature is increased. Increasing the temperature difference between the laminate and rolls allows the interlayer film to be deformed only at around the surface layer portion. As a result, the surface roughness (Rz) on the interface side of the resin films 1 and 2 can be reduced. More specifically, it is preferable to set the roll temperature to 120° C. to 170° C. and the temperature of the film prior to the formation of a large number of minute recesses and a large number of minute projections to 50° C. to 100° C.

The surface roughness (Rz) on the interface side of the resin films 1 and 2 is also affected by the properties of the interlayer film. For example, when the 80° C. creep elongation rate is lowered, the surface roughness (Rz) on the interface side of the resin films 1 and 2 can be reduced.

The preferable surface roughness (Rz) on the interface side of the resin films 1 and 2 can be achieved by combining the conditions including the roll temperature, the temperature of the film prior to the formation of a large number of minute recesses and a large number of minute projections, and the 80° C. creep elongation rate. For example, the preferable surface roughness (Rz) can be achieved by setting the roll temperature to 120° C. to 170° C., the temperature of the film prior to the formation of a large number of minute recesses and a large number of minute projections to 50° C. to 100° C., and the 80° C. creep elongation rate to 80% or lower.

Examples of the combination of three or more resin layers constituting the interlayer film for laminated glass of the present invention includes a combination of protective layers, as the first surface layer and second surface layer, and a sound insulation layer sandwiched between the protective layers, which is used to improve the sound insulation properties of a laminated glass and constitutes an interlayer film for laminated glass having excellent sound insulation properties (hereafter, also referred to as "sound-insulating interlayer film").

In the present invention, even when the laminate includes the resin layers different in the characteristics, such as the sound insulation layer and the protective layers, the optical distortion can be prevented.

The sound-insulating interlayer film is more specifically described in the following.

In the sound insulation interlayer film, the sound insulation layer imparts the sound insulation properties.

The sound insulation layer preferably contains polyvinyl acetal X and a plasticizer.

The polyvinyl acetal X can be prepared by acetalizing polyvinyl alcohol with an aldehyde. The polyvinyl alcohol is normally prepared by saponifying polyvinyl acetate.

The lower limit of the degree of polymerization of the polyvinyl alcohol is preferably 200, and the upper limit thereof is preferably 5000. The polyvinyl alcohol having a degree of polymerization of 200 or higher can improve the penetration resistance of the sound insulation interlayer film to be obtained. The polyvinyl alcohol having a degree of polymerization of 5000 or lower can ensure the molding properties of a sound insulation layer. The lower limit of the degree of polymerization of the polyvinyl alcohol is more preferably 500, and the upper limit thereof is more preferably 4000.

With regard to the carbon number of the aldehyde used for acetalizing the polyvinyl alcohol, the lower limit is preferably 4, and the upper limit is preferably 6. The aldehyde having a carbon number of 4 or greater allows the sound insulation layer to stably contain a sufficient amount of a plasticizer to exhibit excellent sound insulation properties. Moreover, bleeding out of the plasticizer can be inhibited. The aldehyde having a carbon number of 6 or smaller facilitates synthesis of the polyvinyl acetal X, ensuring the productivity.

The C4-C6 aldehyde may be a linear aldehyde or branched aldehyde, and examples thereof include n-butyraldehyde and n-valeraldehyde.

The upper limit of the hydroxy group content of the polyvinyl acetal X is preferably 30 mol %. The polyvinyl acetal X having a hydroxy group content of 30 mol % or lower allows the sound insulation layer to contain a plasticizer in an amount needed for exertion of sound insulation properties, and also inhibits bleeding out of the plasticizer. The upper limit of the hydroxy group content of the polyvinyl acetal X is more preferably 28 mol %, still more preferably 26 mol %, particularly preferably 24 mol %. The lower limit thereof is preferably 10 mol %, more preferably 15 mol %, still more preferably 20 mol %.

The hydroxy group content of the polyvinyl acetal X is a value in percentage of the mol fraction (mol %) obtained by dividing the amount of ethylene groups to which hydroxy groups are bonded by the total ethylene group content in the main chain. The amount of ethylene groups to which hydroxy groups are bonded can be determined by measuring the amount of ethylene groups to which hydroxy groups are bonded in the polyvinyl acetal X based on a method in conformity with JIS K6728 "Testing methods for Polyvinyl Butyral".

The lower limit of the acetal group content of the polyvinyl acetal X is preferably 60 mol %, and the upper limit thereof is preferably 85 mol %. The polyvinyl acetal X having an acetal group content of 60 mol % or higher can increase the hydrophobicity of the sound insulation layer to allow the sound insulation layer to contain a plasticizer in an amount needed for exertion of sound insulation properties. Moreover, bleeding out of the plasticizer or whitening can be inhibited. The polyvinyl acetal X having an acetal group content of 85 mol % or lower facilitates synthesis of the polyvinyl acetal X, ensuring the productivity. The acetal group content can be determined by measuring the amount of ethylene groups to which acetal groups are bonded in the polyvinyl acetal X based on a method in conformity with JIS K6728 "Testing methods for Polyvinyl Butyral".

The lower limit of the acetyl group content of the polyvinyl acetal X is preferably 0.1 mol %, and the upper limit thereof is preferably 30 mol %. The polyvinyl acetal X having an acetyl group content of 0.1 mol % or higher allows the sound insulation layer to contain a plasticizer in an amount needed for exertion of sound insulation properties, and can inhibit bleeding out of the plasticizer. The polyvinyl acetal X having an acetyl group content of 30 mol % or lower increases the hydrophobicity of the sound insulation layer, inhibiting whitening of the layer. The lower limit of the acetyl group content is more preferably 1 mol %, still more preferably 5 mol %, particularly preferably 8 mol %. The upper limit thereof is more preferably 25 mol %, still more preferably 20 mol %. The acetyl group content is a value in percentage of the mol fraction (mol %) obtained by subtracting the amount of ethylene groups to which acetal groups are bonded and the amount of ethylene groups to which hydroxy groups are bonded from the total ethylene group content of the main chain and then dividing the resulting value by the total ethylene group content of the main chain.

In particular, the polyvinyl acetal X is preferably a polyvinyl acetal having an acetyl group content of 8 mol % or higher or having an acetyl group content of less than 8 mol % and an acetal group content of 68 mol % or higher because the sound insulation layer to be obtained can easily contain a plasticizer in an amount needed for exertion of the sound insulation properties.

The lower limit of the plasticizer content in the sound insulation layer is preferably 45 parts by mass, and the upper limit thereof is preferably 80 parts by mass, based on 100 parts by mass of the polyvinyl acetal X. The sound insulation layer having a plasticizer content of 45 parts by mass or higher can exhibit high sound insulation properties, and the sound insulation layer having a plasticizer content of 80 parts by mass or lower can inhibit bleeding out of the plasticizer, thereby preventing reduction in the transparency or adhesion of the interlayer film for laminated glass. The lower limit of the plasticizer content is more preferably 50 parts by mass, still more preferably 55 parts by mass, and the upper limit thereof is more preferably 75 parts by mass, still more preferably 70 parts by mass.

The lower limit of the thickness of the sound insulation layer is preferably 50 µm. The sound insulation layer having a thickness of 50 µm or more can exhibit sufficient sound insulation properties. The lower limit of the thickness of the sound insulation layer is more preferably 70 µm, still more preferably 80 µm. The upper limit thereof is not particularly limited, and is preferably 150 µm in consideration of the appropriate thickness as an interlayer film for laminated glass.

The protective layers inhibit bleeding out of a large amount of plasticizer contained in the sound insulation layer, thereby preventing reduction in the adhesion between the interlayer film for laminated glass and glass, and also impart penetration resistance to the interlayer film for laminated glass.

The protective layers preferably contain, for example, polyvinyl acetal Y and a plasticizer, more preferably polyvinyl acetal Y having a greater hydroxy group content than the polyvinyl acetal X and a plasticizer.

The polyvinyl acetal Y can be prepared by acetalizing polyvinyl alcohol with an aldehyde.

The polyvinyl alcohol is normally prepared by saponifying polyvinyl acetate. The lower limit of the degree of polymerization of the polyvinyl alcohol is preferably 200, and the upper limit thereof is preferably 5000. The polyvinyl alcohol having a degree of polymerization of 200 or higher can improve the penetration resistance of the sound-insulating interlayer film to be obtained. The polyvinyl alcohol having a degree of polymerization of 5000 or lower can ensure the molding properties of protective layers. The lower limit of the degree of polymerization of the polyvinyl alcohol is more preferably 500, and the upper limit thereof is more preferably 4000.

With regard to the carbon number of the aldehyde used for acetalizing the polyvinyl alcohol, the lower limit is preferably 3, and the upper limit is preferably 4. The aldehyde having a carbon number of 3 or greater can increase the penetration resistance of the interlayer film for laminated glass to be obtained. The aldehyde having a carbon number of 4 or less can improve the productivity of the polyvinyl acetal Y.

The C3-C4 aldehyde may be a linear aldehyde or branched aldehyde, and examples thereof include n-butyraldehyde.

When the interlayer film for laminated glass of the present invention contains polyvinyl acetal, the 80° C. creep elongation rate and 80° C. creep elastic modulus can be adjusted by the following method.

The polyvinyl alcohol is acetalized, so that polyvinyl acetal is precipitated. The polyvinyl acetal is blended with an acid and aged. The 80° C. creep elongation rate and 80° C. creep elastic modulus can be achieved as desired by setting the concentration of an acid used, and the temperature and time for aging within predetermined ranges, and combining the conditions.

The acid used for aging is not particularly limited, and is preferably hydrochloric acid or nitric acid. When the concentration of the acid used is higher, the 80° C. creep elongation rate is lowered and the 80° C. creep elastic modulus increases.

From the standpoint of setting the 80° C. creep elongation rate and 80° C. creep elastic modulus within the preferable ranges, the aging temperature is preferably 60° C. or higher, more preferably 65° C. or higher. When the aging temperature is higher, the 80° C. creep elongation rate becomes lower and the 80° C. creep elastic modulus becomes higher. The aging temperature is not particularly limited, and is preferably 100° C. or lower.

From the standpoint of setting the 80° C. creep elongation rate and 80° C. creep elastic modulus within the preferable ranges, the aging time is preferably 1.5 hours or longer, more preferably 2 hours or longer. When the aging time is longer, the 80° C. creep elongation rate becomes lower and the 80° C. creep elastic modulus becomes higher.

The upper limit of the hydroxy group content of the polyvinyl acetal Y is 33 mol %, and the lower limit thereof is preferably 28 mol %. The polyvinyl acetal Y having a hydroxy group content of 33 mol % or lower can prevent whitening of the interlayer film for laminated glass to be obtained. The polyvinyl acetal Y having a hydroxy group content of 28 mol % or higher can increase the penetration resistance of the interlayer film for laminated glass to be obtained.

The lower limit of the acetal group content of the polyvinyl acetal Y is preferably 60 mol %, and the upper limit thereof is preferably 80 mol %. The polyvinyl acetal Y having an acetal group content of 60 mol % or higher allows the protective layers to contain a plasticizer in an amount needed for exertion of sufficient penetration resistance. The polyvinyl acetal Y having an acetal group content of 80 mol % or lower can ensure the adhesion between the protective layers and glass. The lower limit of the acetal group content is more preferably 65 mol %, and the upper limit thereof is more preferably 69 mol %.

The upper limit of the acetyl group content of the polyvinyl acetal Y is preferably 7 mol %. The polyvinyl acetal Y having an acetyl group content of 7 mol % or lower can increase the hydrophobicity of the protective layers, thereby preventing whitening thereof. The upper limit of the acetyl group content is more preferably 2 mol %, and the lower limit thereof is preferably 0.1 mol %. The hydroxy group content, acetal group content, and acetyl group content of each of the polyvinyl acetals A, B, and Y can be measured by the same method as in the case of the polyvinyl acetal X.

The lower limit of the plasticizer content in the protective layers is preferably 20 parts by mass, and the upper limit thereof is preferably 45 parts by mass, based on 100 parts by mass of the polyvinyl acetal Y. The protective layers having a plasticizer content of 20 parts by mass or higher can ensure the penetration resistance. The protective layers having a plasticizer content of 45 parts by mass or lower can inhibit bleeding out of the plasticizer to prevent reduction in the transparency or adhesion of the interlayer film for laminated glass. The lower limit of the plasticizer content is more preferably 30 parts by mass, still more preferably 35 parts by mass, and the upper limit thereof is more preferably 43 parts by mass, still more preferably 41 parts by mass. The plasticizer content in the protective layers is preferably smaller than the plasticizer content in the sound insulation layer because sound insulation properties of the laminated glass to be obtained are further improved.

Since the sound insulation properties of the laminated glass is further improved, the hydroxy group content of the polyvinyl acetal Y is preferably larger than the hydroxy group content of the polyvinyl acetal X, more preferably larger by 1 mol % or more, still more preferably larger by 5 mol % or more, particularly preferably larger by 8 mol % or more. Adjustment of the hydroxy group contents of the polyvinyl acetal X and polyvinyl acetal Y enables control of the plasticizer contents in the sound insulation layer and the protective layers, and the glass transition temperature of the sound insulation layer is lowered. As a result, the sound insulation properties of the laminated glass are further improved.

In addition, since the sound insulation properties of the laminated glass is further improved, the plasticizer content (hereafter, also referred to as content X) in the sound insulation layer based on 100 parts by mass of the polyvinyl acetal X is preferably larger than the plasticizer content (hereafter, also referred to as content Y) in the protective layers based on 100 parts by mass of the polyvinyl acetal Y, more preferably larger by 5 parts by mass or more, still more preferably larger by 15 parts by mass or more, particularly preferably larger by 20 parts by mass or more. When the content X and the content Y are adjusted, the glass transition temperature of the sound insulation layer can be lowered. As a result, the sound insulation properties of the laminated glass can be further improved.

The lower limit of the thickness of the protective layer is preferably 200 μm, and the upper limit thereof is preferably 1000 μm. The protective layer having a thickness of 200 μm or more can ensure the penetration resistance.

The lower limit of the thickness of the protective layer is more preferably 300 μm, and the upper limit thereof is more preferably 700 μm.

The sound-insulating interlayer film may be produced by any method. In an exemplary method, the sound insulation layer and the protective layers are prepared each in the shape of a sheet by a conventional film-forming method such as extrusion, calendering, or pressing, and the obtained layers are laminated together.

The present invention also encompasses a laminated glass in which the interlayer film for laminated glass of the present invention is sandwiched between a pair of glass sheets.

The glass sheets may be commonly used transparent plate glass. Examples thereof include inorganic glass such as float plate glass, polished plate glass, molded plate glass, wired glass, wire-reinforced plate glass, colored plate glass, heat-absorbing glass, heat-reflecting glass, and green glass. Also usable is UV light-shielding glass in which a UV light-shielding coating is formed on the surface of glass. Moreover, organic plastic sheets such as polyethylene terephthalate, polycarbonate, or polyacrylate sheets may also be used.

As the glass sheets, two or more kinds of glass sheets may be used. Exemplary cases thereof include a laminated glass in which the interlayer film for laminated glass of the present invention is sandwiched between a transparent float plate glass and a colored glass sheet such as green glass. Moreover, as the glass sheets, two or more kinds of glass sheets different in the thickness may be used.

The laminated glass of the present invention may be produced by any method, and may be produced by a conventionally known method.

Advantageous Effects of Invention

The present invention can provide an interlayer film for laminated glass having small optical distortion while having a multilayer structure of two or more layers, and a laminated glass including the interlayer film for laminated glass.

DESCRIPTION OF EMBODIMENTS

Embodiments of the present invention are specifically described with reference to, but not limited to, examples.

Example 1

(1) Preparation of Resin Composition for Sound Insulation Layer

Polyvinyl alcohol having an average degree of polymerization of 2300 was acetalized with n-butyraldehyde to give polyvinyl butyral (acetyl group content: 12.5 mol %, butyral group content: 64.5 mol %, hydroxy group content: 23.0 mol %). An amount of 100 parts by mass of the polyvinyl butyral was blended with 60 parts by mass of triethylene glycol-di-2-ethylhexanoate (3GO) as a plasticizer, and sufficiently kneaded with a mixing roll to give a resin composition for sound insulation layer.

(2) Synthesis of Resin for Protective Layer

A reaction container equipped with a stirrer was charged with 2700 mL of ion-exchanged water and 300 g of polyvinyl alcohol (average degree of polymerization: 1700, saponification degree: 99 mol %), and the mixture was molten by heat with stirring to give a solution. The solution was blended with 60% by weight nitric acid, as a catalyst, such that the nitric acid concentration reached 0.4% by weight. The temperature of the mixture was adjusted to 15° C., and then the mixture was blended with 23 g of n-butyraldehyde with stirring. Then, the resulting solution was blended with 140 g of n-butyraldehyde, so that polyvinyl butyral in the shape of white particles was precipitated. After 15 minutes from the precipitation of the polyvinyl butyral, 60% by weight nitric acid was added such that the nitric acid concentration reached 1.6% by weight. The resulting mixture was heated to 65° C. and aged for two hours at 65° C. Next, after cooling and neutralization of the solution, the polyvinyl butyral was washed with water and dried. Polyvinyl butyral was thus prepared.

(3) Preparation of Resin Composition for Protective Layer

An amount of 100 parts by mass of the polyvinyl butyral obtained as a final product of the "(2) Synthesis of resin for protective layer" was blended with 40 parts by mass of triethylene glycol-di-2-ethylhexanoate (3GO) as a plasticizer, and kneaded well with a mixing roll to give a resin composition for protective layer.

(4) Production of Interlayer Film for Laminated Glass (4-1) Production of Laminate The obtained resin composition for sound insulation layer and the resin composition for protective layer were coextruded from a coextruder to give a laminate having a triple layer structure in which a first surface layer (protective layer) made of the resin composition for protective layer with a thickness of 340 μm, an intermediate layer (sound insulation layer) made of the resin composition for sound insulation layer with a thickness of 100 μm, and a second surface layer (protective layer) made of the resin composition for protective layer with a thickness of 370 μm were laminated in the stated order.

(4-2) Formation of Recesses and Projections

The resulting laminate was passed through a pair of embossing rolls, a device for transferring a pattern of projections and recesses, on which a large number of minute recesses and a large number of minute projections were formed, thereby preparing a laminate on which a large number of minute recesses and a large number of minute projections were formed.

A pair of embossing rolls including a metal roll having a surface milled with a triangular oblique line-type mill and a rubber roll having a JIS hardness of 45 to 75 was used as a device for transferring a pattern of projections and recesses. The obtained laminate on which a large number of minute recesses and a large number of minute projections were formed was passed through the embossing rolls, whereby projections and recesses having a surface roughness (Rz) of 31 μm in which recesses having a groove shape with a continuous bottom (shape of an engraved line) were formed in parallel with one another at equal intervals were imparted to the surface of the first surface layer and the surface of the second surface layer of the laminate. An interlayer film for laminated glass was thus prepared. The surface roughness Rz was measured by a method in conformity with JIS B-0601 (1994). The transferring for formation of recesses having a groove shape (shape of an engraved line) was performed under the conditions of a temperature of the laminate of 95° C., a roll temperature of 130° C., and a pressure of 500 kPa.

(5) Production of Laminated Glass

The obtained interlayer film for laminated glass was used for production of two types of laminated glasses having different extension rates of the interlayer film for laminated glass of 1 and 1.2 times the original length.

First, a laminated glass in which the extension rate of the interlayer film for laminated glass was 1 time was produced as follows.

The interlayer film for laminated glass obtained in "(4) production of interlayer film for laminated glass" was sandwiched between two clear glass sheets (30 cm in length×30 cm in width×2.5 mm in thickness) in conformity with JIS R 3202 (1996), and a portion protruding therefrom was cut, whereby preparing a laminated glass component. The obtained laminated glass component was placed into a rubber bag, which was connected to a vacuum suction device. The rubber bag was held under a reduced pressure of −60 kPa (absolute pressure of 16 kPa) for 10 minutes with heating so that the temperature (preliminary pressure-bonding temperature) of the laminated glass component reached 70° C. Thereafter, the pressure was returned to atmospheric pressure, whereby completing the preliminary pressure-bonding. The preliminarily pressure-bonded laminated glass component was placed in an autoclave, and held at a temperature of 140° C. and a pressure of 1300 kPa for ten minutes. Then, the temperature was lowered to 50° C. and the pressure was returned to atmospheric pressure, whereby the final pressure-bonding was completed. A laminated glass was thus prepared.

Next, a laminated glass in which the extension rate of the interlayer film for laminated glass was 1.2 times was prepared as follows.

The interlayer film for laminated glass obtained in "(4) Production of interlayer film for laminated glass" was heated in a gear oven until the temperature of the film surface reached 120° C. The interlayer film for laminated glass was then extended at a rate of 5 to 15 cm/s until the length thereof became longer than the length before heating by 1.2 times. The interlayer film for laminated glass was immobilized with a jig so that the extension by 1.2 times was maintained, and cooled with water at 25° C. The cooled film was allowed to stand in an immobilized state at a temperature of 25° C. and a humidity of 30% RH for 12 hours to be dried. The dried interlayer film for laminated glass was sandwiched between two clear glass sheets (30 cm in length×30 cm in width×2.5 mm in thickness) in conformity with JIS R 3202 (1996), and a portion protruding from the laminate was cut, whereby preparing a laminated glass component. The obtained laminated glass component was placed into a rubber bag, which was connected to a vacuum suction device. The rubber bag was held under a reduced pressure of −60 kPa (absolute pressure of 16 kPa) for 10 minutes with heating so that the temperature (preliminary pressure-bonding temperature) of the laminated glass component reached 70° C. Thereafter, the pressure was returned to atmospheric pressure, whereby completing the preliminary pressure-bonding. The preliminarily pressure-bonded laminated glass component was placed in an autoclave, and held at a temperature of 140° C. and a pressure of 1300 kPa for 10 minutes. Then, the temperature was lowered to 50° C. and the pressure was returned to atmospheric pressure, whereby the final pressure-bonding was completed. A laminated glass was thus prepared.

Example 2

An interlayer film for laminated glass and laminated glasses were prepared in the same manner as in Example 1, except that the temperature of the laminate and the coarseness of embossing pattern during formation of recesses having a groove shape (shape of an engraved line) in "(4-2) Formation of recesses and projections" were changed as shown in Table 1.

Example 3

Polyvinyl butyral was prepared in the same manner as in Example 1, except that the aging at 65° C. for two hours was changed to the aging at 65° C. for two hours and 15 minutes in "(2) Synthesis of resin for protective layer". An interlayer film for laminated glass and laminated glasses were prepared in the same manner as in Example 1, except that the resin composition for protective layer was prepared from the obtained polyvinyl butyral in "(3) Preparation of resin composition for protective layer" and that the temperature of the laminate and the coarseness of embossing pattern during formation of recesses having a groove shape (shape of an engraved line) in "(4-2) Formation of recesses and projections" were changed as shown in Table 1.

Example 4

An interlayer film for laminated glass and laminated glasses were prepared in the same manner as in Example 1, except that the temperature of the laminate and the coarseness of embossing pattern during formation of recesses having a groove shape (shape of an engraved line) in "(4-2) Formation of recesses and projections" were changed as shown in Table 1.

Example 5

An interlayer film for laminated glass and laminated glasses were prepared in the same manner as in Example 1, except that the coarseness of the embossing pattern for forming a large number of minute recesses and a large number of minute projections, and the temperature of the laminate and the coarseness of embossing pattern during formation of recesses having a groove shape (shape of an engraved line) in "(4-2) Formation of recesses and projections" were changed as shown in Table 1.

Example 6

A laminate on which a large number of minute recesses and a large number of minute projections were formed was prepared in the same manner as in Example 1, except that the coarseness of the embossing pattern for forming a large number of minute recesses and a large number of minute projections in "(4-2) Formation of recesses and projections" was changed as shown in Table 1. The obtained laminate on which a large number of minute recesses and a large number of minute projections were formed was used as an interlayer film for laminated glass on which no recesses having a groove shape (shape of an engraved line) were formed. Using the obtained interlayer film for laminated glass, laminated glasses were prepared in the same manner as in Example 1.

Example 7

A laminate was prepared in the same manner as in Example 1, except that the thickness of each resin layer in "(4-1) Production of laminate" was changed as shown in Table 1. Using the obtained laminate, a laminate on which a large number of minute recesses and a large number of minute projections were formed was prepared in the same manner as in Example 1, except that the coarseness of the embossing pattern for forming a large number of minute recesses and a large number of minute projections was changed as shown in Table 1. The obtained laminate on which a large number of minute recesses and a large number of minute projections were formed was used as an interlayer film for laminated glass on which no recesses having a groove shape (shape of an engraved line) were formed.

Using the obtained interlayer film for laminated glass, a laminated glass was prepared in the same manner as in Example 1.

Example 8

The procedure of "(1) Preparation of resin composition for sound insulation layer" in Example 1 was changed as follows.
(1) Preparation of Resin Composition for Sound Insulation Layer
Polyvinyl alcohol having an average degree of polymerization of 2300 was acetalized with n-butyraldehyde to give polyvinyl butyral (acetyl group content: 0.5 mol %, butyral group content: 81.1 mol %, hydroxy group content: 18.5 mol %). An amount of 100 parts by mass of the polyvinyl butyral was blended with 60 parts by mass of triethylene glycol-di-2-ethylhexanoate (3GO) as a plasticizer, and sufficiently kneaded with a mixing roll to give a resin composition for sound insulation layer.
The procedure of "(2) Synthesis of resin for protective layer" in Example 1 was changed as follows.
(2) Synthesis of Resin for Protective Layer
A reaction container equipped with a stirrer was charged with 2700 mL of ion-exchanged water and 300 g of polyvinyl alcohol having an average degree of polymerization of 1700 and a saponification degree of 99 mol %. The mixture was molten by heating with stirring to give a solution. Next, the solution was blended with 60% by weight nitric acid as a catalyst such that the nitric acid concentration reached 0.4% by weight. The temperature of the mixture was adjusted to 15° C., and then the mixture was blended with 23 g of n-butyraldehyde with stirring. Then, the resulting solution was blended with 140 g of n-butyraldehyde and 6 mg of glutaraldehyde, so that polyvinyl butyral in the shape of white particles was precipitated. After 15 minutes from the precipitation of the polyvinyl butyral, 60% by weight nitric acid was added such that the nitric acid concentration reached 1.6% by weight. The resulting mixture was heated to 64° C. and aged for two hours at 64° C. Next, after cooling and neutralization of the solution, the polyvinyl butyral was washed with water and dried. Polyvinyl butyral was thus prepared.
The procedure of "(3) Preparation of resin composition for protective layer" in Example 1 was changed as follows.
(3) Preparation of Resin Composition for Protective Layer
An amount of 100 parts by mass of the polyvinyl butyral obtained as a final product in "(2) Synthesis of resin for protective layer" was blended with 40 parts by mass of triethylene glycol-di-2-ethylhexanoate (3GO) as a plasticizer, and the mixture was sufficiently kneaded with a mixing roll to give a resin composition for protective layer.
The procedure of "(4-1) Production of laminate" in Example 1 was changed as follows.
(4-1) Production of Laminate
The resin composition for sound insulation layer and the resin composition for protective layer obtained in "(1) Preparation of resin composition for sound insulation layer" and "(3) Preparation of resin composition for protective layer", respectively, were coextruded from a coextruder to give a laminate having a triple layer structure in which a first surface layer (protective layer) made of the resin composition for protective layer with a thickness of 345 µm, an intermediate layer (sound insulation layer) made of the resin composition for sound insulation layer with a thickness of 100 µm, and a second surface layer (protective layer) made of the resin composition for protective layer with a thickness of 350 µm were laminated in the stated order. Co-extrusion was performed under the following conditions so that the melt fracture was controlled, and a laminate on which a large number of minute recesses and a large number of minute projections were formed was produced. Specifically, the die width was set to 400 mm, the extrusion amount was set to 70 kg/hr·m, the die lip gap was set to 0.7 mm, and the surface temperature of the film right after coming out of the die was set to 190° C.
Then, an interlayer film for laminated glass and laminated glasses were produced in the same manner as in Example 1, except that the temperature of the laminate and the coarseness of the embossing pattern during formation of recesses having a groove shape (shape of an engraved line) in "(4-2) Formation of recesses and projections" was changed as shown in Table 1.

Example 9

The procedure of "(1) Preparation of resin composition for sound insulation layer" in Example 1 was changed as follows.
(1) Preparation of Resin Composition for Sound Insulation Layer
Polyvinyl alcohol having an average degree of polymerization of 2300 was acetalized with n-butyraldehyde to give polyvinyl butyral (acetyl group content: 7.6 mol %, butyral group content: 68.1 mol %, hydroxy group content: 24.3 mol %). An amount of 100 parts by mass of the polyvinyl butyral was blended with 60 parts by mass of triethylene glycol-di-2-ethylhexanoate (3GO) as a plasticizer, and sufficiently kneaded with a mixing roll to give a resin composition for sound insulation layer.
The procedure of "(4-1) Production of laminate" in Example 1 was changed as follows.
(4-1) Production of Laminate
The resin composition for sound insulation layer and the resin composition for protective layer obtained in "(1) Preparation of resin composition for sound insulation layer" and "(3) Preparation of resin composition for protective layer", respectively, were coextruded from a coextruder to give a laminate having a triple layer structure in which a first surface layer (protective layer) made of the resin composition for protective layer with a thickness of 337 µm, an intermediate layer (sound insulation layer) made of the resin composition for sound insulation layer with a thickness of 107 µm, and a second surface layer (protective layer) made of the resin composition for protective layer with a thickness of 382 µm were laminated in the stated order. The coextrusion was performed under the following conditions so that the melt fracture was controlled, and a laminate on which a large number of minute recesses and a large number of minute projections were formed was produced. Specifically, the die width was set to 400 mm, the extrusion amount was set to 70 kg/hr·m, the die lip gap was set to 0.7 mm, and the surface temperature of the film right after coming out of the die was set to 190° C.
Then, an interlayer film for laminated glass and laminated glasses were produced in the same manner as in Example 1, except that the temperature of the laminate and the coarseness of the embossing pattern for forming recesses having a groove shape (shape of an engraved line) was changed as shown in Table 1 in "(4-2) Formation of recesses and projections."

Example 10

The procedure of "(1) Preparation of resin composition for sound insulation layer" in Example 1 was changed as follows.

(1) Preparation of Resin Composition for Sound Insulation Layer

Polyvinyl alcohol having an average degree of polymerization of 2300 was acetalized with n-butyraldehyde to give polyvinyl butyral (acetyl group content: 7.6 mol %, butyral group content: 68.1 mol %, hydroxy group content: 24.3 mol %). An amount of 100 parts by mass of the polyvinyl butyral was blended with 60 parts by mass of triethylene glycol-di-2-ethylhexanoate (3GO) as a plasticizer, and sufficiently kneaded with a mixing roll to give a resin composition for sound insulation layer.

The procedure of "(4-1) Production of laminate" in Example 1 was changed as follows.

(4-1) Production of Laminate

The resin composition for sound insulation layer and the resin composition for protective layer obtained in "(1) Preparation of resin composition for sound insulation layer" and "(3) Preparation of resin composition for protective layer", respectively, were coextruded from a coextruder to give a laminate having a triple layer structure in which a first surface layer (protective layer) made of the resin composition for protective layer with a thickness of 337 µm, an intermediate layer (sound insulation layer) made of the resin composition for sound insulation layer with a thickness of 107 µm, and a second surface layer (protective layer) made of the resin composition for protective layer with a thickness of 382 µm were laminated in the stated order. The coextrusion was performed under the following conditions so that the melt fracture was controlled, and a laminate on which a large number of minute recesses and a large number of minute projections were formed was produced. Specifically, the die width was set to 400 mm, the extrusion amount was set to 70 kg/hr·m, the die lip gap was set to 0.7 mm, and the surface temperature of the film right after coming out of the die was set to 185° C.

Then, an interlayer film for laminated glass and laminated glasses were produced in the same manner as in Example 1, except that the recesses having a groove shape (shape of an engraved line) were not formed in "(4-2) Formation of recesses and projections".

Comparative Example 1

Polyvinyl butyral was prepared in the same manner as in Example 1, except that the aging time at 65° C. for two hours was changed to the aging time at 65° C. for one hour in "(2) Synthesis of resin for protective layer". An interlayer film for laminated glass and laminated glasses were produced in the same manner as in Example 1, except that the obtained polyvinyl butyral was used for preparation of a resin composition for protective layer in "(3) Preparation of resin composition for protective layer", that the thickness of each resin layer in "(4-1) Production of laminate" was set as shown in Table 1, and that the temperature of the laminate and the coarseness of the embossing pattern during formation of recesses having a groove shape (shape of an engraved line) in "(4-2) Formation of recesses and projections" were set as shown in Table 1.

Comparative Example 2

Polyvinyl butyral was prepared in the same manner as in Example 1, except that the aging time at 65° C. for two hours was changed to the aging time at 65° C. for 30 minutes in "(2) Synthesis of resin for protective layer". An interlayer film for laminated glass and laminated glasses were produced in the same manner as in Example 1, except that the obtained polyvinyl butyral was used for preparation of a resin composition for protective layer in "(3) Preparation of resin composition for protective layer", and that the temperature of the laminate and the coarseness of the embossing pattern during formation of recesses having a groove shape (shape of an engraved line) in "(4-2) Formation of recesses and projections" were set as shown in Table 1.

(Evaluation)

The interlayer films for laminated glass obtained in the examples and comparative examples were evaluated as follows. Table 1 shows the results.

(1) Evaluation on Surface Roughness (Rz) of Resin Film 1 and Resin Film 2 Sampled from Interlayer Film Each obtained interlayer film for laminated glass was left to stand at 23° C. and a humidity of 30% RH for three hours and then attached to a flat acrylic sheet with an adhesive (Cemedine Co., Ltd., "3000 GOLD Liquid") in such a manner that the exterior surface of the second surface layer was in contact with the acrylic sheet. The resulting film was dried at 23° C. for 24 hours. Next, after standing at 23° C. and a humidity of 30% RH for three hours, the film was cut with a microtome (Leica, "RM2265", Grade of blade "Leica 819 Blade") at 23° C. and a humidity of 30% RH in the horizontal direction of the interlayer film for laminated glass, thereby preparing a plurality of resin films. The cutting direction was set in parallel with the machine direction in film formation.

Here, the film was cut at a portion of 80 to 90 µm distant on the first surface layer side from the interface between the first surface layer and the intermediate layer and then at a portion of 50 µm distant from the cut face on the second surface layer side to give a resin film 1 having a thickness of 50 µm.

The film was attached to a flat acrylic sheet in such a manner that the exterior side of the first surface layer, not the exterior side of the second surface layer, was in contact with the acrylic sheet. Then, the film was cut similarly, that is, cut at a portion of 80 to 90 µm distant on the second surface layer side from the interface between the second surface layer and the intermediate layer and then at a portion of 50 µm distant from the cut face on the first surface layer side to give a resin film 2 with a thickness of 50 µm.

The resin film 1 and resin film 2 obtained by the cutting were left to stand at a temperature of 23° C. and a humidity of 30% RH for three hours, and then subjected to measurement of the surface roughness (Rz) on the interface side with a three dimensional roughness tester (KEYENCE CORPORATION, "KS-1100", model number of head: "LT-9510VM"). The measurement was performed under the following conditions of the measurement ranges of X axis and Y axis set to 12500 µm and 5000 µm, respectively, the measuring pitch of both X axis and Y axis set to 10 µm, the moving speed of 1000 µm/sec, the temperature set to 23° C., and the humidity set to 30% RH. The surface roughness (Rz) on the interface side was calculated using analysis software (KEYENCE CORPORATION, "KS-Analyzer") by a method in conformity with JIS B-0601 (1994). The cut off value upon measurement of the surface roughness was set to 2.5 mm. The surface roughness (Rz) was measured at a portion where no trace of cutting with the microtome, no contaminants, or no bubbling was observed. The average of measured values at three sites was employed as the surface roughness (Rz). It is to be noted that the measurement was completed within 360 minutes.

(2) Measurement of Difference in Refractive Index of Interlayer Film

The resin composition for protective layer was supplied to a twin-screw extruder to be molten and kneaded, and introduced to a T-die for widening. Then, the resin composition was ejected from the opening of the extruder and soon cooled to be solidified to give a thermoplastic resin film with a thickness of 760 μm. The obtained thermoplastic resin film was left to stand at 23° C. and 30% RH for three hours. The thermoplastic resin was cut at a central portion in the width direction of the film to give a sheet piece in a size of 10 mm in width and 30 mm in length. The obtained sheet piece was subjected to measurement of the refractive index nD at D line (wavelength: 589.3 nm) using an Abbe's refractometer (Atago Co., Ltd., "NAR-1T SOLID") at 25° C. in conformity with JIS K7142. The refractive index nD was taken as the refractive index of the resin composition for protective layer, namely, the refractive index of the first surface layer and the refractive index of the second surface layer. The refractive index nD of the resin composition for sound insulation layer was measured in the same manner, and the obtained refractive index nD was taken as the refractive index of the intermediate layer.

(3) Measurement of 80° C. Creep Elongation Rate and 80° C. Creep Elastic Modulus of Interlayer Film The interlayer film for laminated glass having a predetermined cross-sectional area (8.1 mm$^2$) was left at a temperature of 25° C. and a humidity of 25% RH for 24 hours so that the temperature and the moisture were conditioned. The resulting interlayer film for laminated glass was left at a predetermined temperature (80° C.) for 30 minutes while carrying a predetermined weight (20 g) on its lower end. The elongation of the interlayer film for laminated glass was measured and the 80° C. creep elongation rate (%) was calculated using the following equation:

80° C. creep elongation rate (%)=(Length after test (cm)−length before test (cm))/length before test (cm)×100.

Based on the obtained 80° C. creep elongation rate, the 80° C. creep elastic modulus (MPa) was calculated using the following equation:

80° C. creep elastic modulus (MPa)=(Weight applied (N))/(initial cross-sectional area of test piece (mm$^2$)×80° C. creep elongation rate (%)/100).

(4) Evaluation on Optical Distortion of Laminated Glass

The laminated glass including the interlayer film for laminated glass (extension rate: 1 time) and the laminated glass including the interlayer film for laminated glass (extension rate: 1.2 times) obtained in each of the examples and comparative examples were irradiated with light emitted from a light source (halogen lamp) through a slit. The projective distortion on a screen was detected by a sensor (camera), and the distortion data was processed by a computer, thereby obtaining an optical distortion value. A higher optical distortion value is considered to indicate greater optical distortion (image distortion).

The method for measuring the optical distortion value is specifically described in the following. The optical distortion value was measured with an optical distortion inspecting device disclosed in JP-A H07-306152. The optical distortion inspecting device includes: a light source unit which emits illumination light toward a light-transmitting object to be inspected; a slit; a projection plane where the illumination light having passed through the object to be inspected is projected; an image inputting portion for generating a grayscale image by capturing the projection plane; and an image processing portion for determining the presence or absence of distortion based on the variation in the gray level of the grayscale image generated by the image inputting portion. Specifically, upon evaluation on the optical distortion by using EYE DICHO-COOL HALOGEN (15V100W) produced by Iwasaki Electric Co., Ltd. as a light source, the illuminance of the light source, the angle of the screen where an optical distortion image is projected, and the angle of the camera were adjusted in such a manner that a laminated glass including a single layer film having a visible light transmittance in conformity with JIS R 3211 (1988) (value for Y under standard illuminant A, A-Y (380 to 780 nm)) of 88% ("U4100" produced by Hitachi High-Technologies Corporation was used) had an optical distortion value of 1.14 and that the optical distortion value in a state of including no glass was adjusted to 1.30. The optical distortion was evaluated under the condition of the laminated glass temperature of 25° C. As the optical distortion values, values in the lengthwise direction and in the width direction can be calculated. In the present case, the smaller value of the two was employed as the optical distortion value. The thermometer used was a contact-type thermometer.

For the use as a windshield for automobiles, the optical distortion is desired to be less than 1.8 when the extension rate is 1 time and the ratio of the optical distortion when the extension rate is 1.2 time to the optical distortion when the extension rate is 1 time (optical distortion when the extension rate is 1.2 time/optical distortion when the extension rate is 1 times) is required to be 1.2 or less. For another application such as a laminated glass for architectures, the optical distortion when the extension rate is 1 time is preferably 3 or less, and the optical distortion when the extension rate is 1.2 times is 5 or less.

TABLE 1

| | | Example 1 | Example 2 | Example 3 | Example 4 | Example 5 | Example 6 | Example 7 |
|---|---|---|---|---|---|---|---|---|
| Film thickness (μm) | First surface layer | 340 | 340 | 340 | 340 | 340 | 340 | 315 |
| | Intermediate layer | 100 | 100 | 100 | 100 | 100 | 100 | 70 |
| | Second surface layer | 370 | 370 | 370 | 370 | 370 | 370 | 400 |
| Condition for forming minute recesses and minute projections | Roughness of embossing pattern (μm) | 10 | 10 | 10 | 10 | 5 | 15 | 30 |
| Condition for forming recesses in the shape of engraved line | Temperature of laminate (° C.) | 95 | 80 | 80 | 100 | 80 | — | — |
| | Roughness of embossing pattern (μm) | 31 | 35 | 34 | 35 | 45 | — | — |
| Evaluation | Surface roughness Rz of resin film 1 (μm) | 0.52 | 0.79 | 0.55 | 0.81 | 0.88 | 0.69 | 1.87 |
| | Surface roughness Rz of resin film 2 (μm) | 0.5 | 0.7 | 0.54 | 0.8 | 0.75 | 0.45 | 1.35 |
| | Difference in refractive index | 0.0094 | 0.0093 | 0.092 | 0.0093 | 0.0092 | 0.0093 | 0.0094 |

TABLE 1-continued

| | | | | | |
|---|---|---|---|---|---|
| 80° C. creep elongation rate (%) | 55 | 55 | 40 | 55 | 55 | 55 | 55 |
| 80° C. creep elastic modulus (MPa) | 0.044 | 0.044 | 0.061 | 0.044 | 0.044 | 0.044 | 0.045 |
| Optical distortion value (extension rate: 1 time) | 1.4 | 1.7 | 1.55 | 1.8 | 1.6 | 1.37 | 2.5 |
| Optical distortion value (extension rate: 1.2 times) | 1.61 | 1.98 | 1.76 | 2.54 | 1.87 | 1.45 | 2.95 |

| | | Example 8 | Example 9 | Example 10 | Comparative Example 1 | Comparative Example 2 |
|---|---|---|---|---|---|---|
| Film thickness (μm) | First surface layer | 345 | 337 | 337 | 290 | 340 |
| | Intermediate layer | 100 | 103 | 103 | 100 | 100 |
| | Second surface layer | 350 | 382 | 382 | 415 | 370 |
| Condition for forming minute recesses and minute projections | Roughness of embossing pattern (μm) | 10 | 10 | 25 | 10 | 10 |
| Condition for forming recesses in the shape of engraved line | Temperature of laminate (° C.) | 80 | 80 | — | 120 | 100 |
| | Roughness of embossing pattern (μm) | 60 | 34 | — | 35 | 35 |
| Evaluation | Surface roughness Rz of resin film 1 (μm) | 0.57 | 0.48 | 0.92 | 2.5 | 2.6 |
| | Surface roughness Rz of resin film 2 (μm) | 0.49 | 0.46 | 0.81 | 2.4 | 2.5 |
| | Difference in refractive index | 0.0092 | 0.0091 | 0.0091 | 0.0095 | 0.0097 |
| | 80° C. creep elongation rate (%) | 55 | 55 | 55 | 100 | 250 |
| | 80° C. creep elastic modulus (MPa) | 0.045 | 0.043 | 0.043 | 0.024 | 0.01 |
| | Optical distortion value (extension rate: 1 time) | 1.45 | 1.35 | 1.54 | 8 | 8.4 |
| | Optical distortion value (extension rate: 1.2 times) | 1.48 | 1.35 | 1.79 | 15 | 18 |

INDUSTRIAL APPLICABILITY

The present invention can provide an interlayer film for laminated glass having small optical distortion while having a multilayer structure of two or more layers, and a laminated glass including the interlayer film for laminated glass.

The invention claimed is:

1. An interlayer film for a laminated glass comprising
a first surface layer,
a second surface layer, and
an intermediate layer therebetween, wherein the intermediate layer comprises at least two resin layers,
wherein the intermediate layer, the first surface layer, and the second surface layer are laminated together,
wherein each of the at least two resin layers, the first surface layer, and the second surface layer contains a thermoplastic resin and a plasticizer, and
wherein the interlayer film has recesses and projections on at least one surface,
wherein, provided that the interlayer film is allowed to stand at 23° C. and a humidity of 30% RH for three hours, and cut with a microtome at 23° C. and a humidity of 30% RH in the horizontal direction of the interlayer film at a portion of 80 to 90 μm distant on a first surface layer side from the interface between the first surface layer and a resin layer contacting the interior side of the first surface layer and then at portion of 50 μm distant from the cut face on a second surface layer side to prepare a resin film 1 having a thickness of 50 μm, the resin film 1 after standing at a temperature of 23° C. and a humidity of 30% RH for three hours has a surface roughness (Rz) measured by a method in conformity with JIS B-0601 (1994) of less than 2.5 μm,
wherein the first surface layer has a thickness of 200 μm or more,
wherein the second surface layer has a thickness of 200 μm or more,
wherein the interlayer film has a creep elongation rate at 80° C. of 80% or lower, and
wherein the interlayer has an optical distortion of less than 1.8 when an extension rate is 1 time the original length and a ratio of an optical distortion when an extension rate is 1.2 times the original length to the optical distortion when an extension rate is 1 time the original length is 1.2 or less.

2. The interlayer film for laminated glass according to claim 1,
wherein, provided that the interlayer film is allowed to stand at 23° C. and a humidity of 30% RH for three hours, and cut at a portion of 80 to 90 μm distant on the second surface layer side from the interface between the second surface layer and a resin layer contacting the interior side of the second surface layer and then at a portion of 50 μm distant from the cut face on the first surface layer side to prepare a resin film 2 having a thickness of 50 μm, the resin film 2 after standing at a temperature of 23° C. and a humidity of 30% RH for three hours has a surface roughness (Rz) measured by a method in conformity with JIS B-0601 (1994) of less than 2.5 μm.

3. The interlayer film for laminated glass according to claim 1,
wherein, provided that the interlayer film is allowed to stand at 23° C. and a humidity of 30% RH for three hours, and cut with a microtome at 23° C. and a humidity of 30% RH in the horizontal direction of the interlayer film at a portion of 80 to 90 μm distant on the first surface layer side from the interface between the first surface layer and a resin layer contacting the interior side of the first surface layer and then at a portion of 50 μm distant from the cut face on the second surface layer side to prepare a resin film 1 having a thickness of 50 μm, the resin film 1 after standing at a temperature of 23° C. and a humidity of 30% RH for three hours has a surface roughness (Rz) measured by a method in conformity with JIS B-0601 (1994) of less than 1.9 μm.

4. The interlayer film for laminated glass according to claim 2,
wherein, provided that the interlayer film is allowed to stand at 23° C. and a humidity of 30% RH for three hours, and cut at a portion of 80 to 90 μm distant on the second surface layer side from the interface between the second surface layer and a resin layer contacting the interior side of the second surface layer and then at a portion of 50 μm distant from the cut face on the first surface layer side to prepare a resin film 2 having a thickness of 50 μm, the resin film 2 after standing at a temperature of 23° C. and a humidity of 30% RH for three hours has a surface roughness (Rz) measured by a method in conformity with JIS B-0601 (1994) of less than 1.9 μm.

5. The interlayer film for laminated glass according to claim 1,
which has a creep elastic modulus at 80° C. of 0.030 MPa or higher.

6. A laminated glass comprising
a pair of glass sheets and
the interlayer film for laminated glass according to claim 1 interposed between the pair of glass sheets.

7. An interlayer film for a laminated glass comprising
a first surface layer,
a second surface layer, and
an intermediate layer therebetween, wherein the intermediate layer comprises at least two resin layers,
wherein the intermediate layer, the first surface layer, and the second surface layer are laminated together,
wherein each of the at least two resin layers, the first surface layer, and the second surface layer contains a thermoplastic resin and a plasticizer, and
wherein the interlayer film has recesses and projections on at least one surface,
wherein, provided that the interlayer film is allowed to stand at 23° C. and a humidity of 30% RH for three hours, and cut with a microtome at 23° C. and a humidity of 30% RH in the horizontal direction of the interlayer film at a portion of 80 to 90 μm distant on a first surface layer side from the interface between the first surface layer and a resin layer contacting the interior side of the first surface layer and then at portion of 50 μm distant from the cut face on a second surface layer side to prepare a resin film 1 having a thickness of 50 μm, the resin film 1 after standing at a temperature of 23° C. and a humidity of 30% RH for three hours has a surface roughness (Rz) measured by a method in conformity with JIS B-0601 (1994) of less than 2.5 μm,
wherein the first surface layer has a thickness of 200 μm or more,
wherein the second surface layer has a thickness of 200 μm or more,
wherein the interlayer film has a creep elongation rate at 80° C. of 80% or lower, and
wherein the interlayer has an optical distortion of 3 or less when an extension rate is 1 time the original length and an optical distortion of 5 or less when an extension rate is 1.2 times the original length.

8. The interlayer film for laminated glass according to claim 7,
wherein, provided that the interlayer film is allowed to stand at 23° C. and a humidity of 30% RH for three hours, and cut at a portion of 80 to 90 μm distant on the second surface layer side from the interface between the second surface layer and a resin layer contacting the interior side of the second surface layer and then at a portion of 50 μm distant from the cut face on the first surface layer side to prepare a resin film 2 having a thickness of 50 μm, the resin film 2 after standing at a temperature of 23° C. and a humidity of 30% RH for three hours has a surface roughness (Rz) measured by a method in conformity with JIS B-0601 (1994) of less than 2.5 μm.

9. The interlayer film for laminated glass according to claim 7,
wherein, provided that the interlayer film is allowed to stand at 23° C. and a humidity of 30% RH for three hours, and cut with a microtome at 23° C. and a humidity of 30% RH in the horizontal direction of the interlayer film at a portion of 80 to 90 μm distant on the first surface layer side from the interface between the first surface layer and a resin layer contacting the interior side of the first surface layer and then at a portion of 50 μm distant from the cut face on the second surface layer side to prepare a resin film 1 having a thickness of 50 μm, the resin film 1 after standing at a temperature of 23° C. and a humidity of 30% RH for three hours has a surface roughness (Rz) measured by a method in conformity with JIS B-0601 (1994) of less than 1.9 μm.

10. The interlayer film for laminated glass according to claim 8,
wherein, provided that the interlayer film is allowed to stand at 23° C. and a humidity of 30% RH for three hours, and cut at a portion of 80 to 90 μm distant on the second surface layer side from the interface between the second surface layer and a resin layer contacting the interior side of the second surface layer and then at a portion of 50 μm distant from the cut face on the first surface layer side to prepare a resin film 2 having a thickness of 50 μm, the resin film 2 after standing at a temperature of 23° C. and a humidity of 30% RH for three hours has a surface roughness (Rz) measured by a method in conformity with JIS B-0601 (1994) of less than 1.9 μm.

11. The interlayer film for laminated glass according to claim 7,
which has a creep elastic modulus at 80° C. of 0.030 MPa or higher.

12. A laminated glass comprising
a pair of glass sheets and
the interlayer film for laminated glass according to claim 7 interposed between the pair of glass sheets.

* * * * *